B₂O₃ 34.0 %

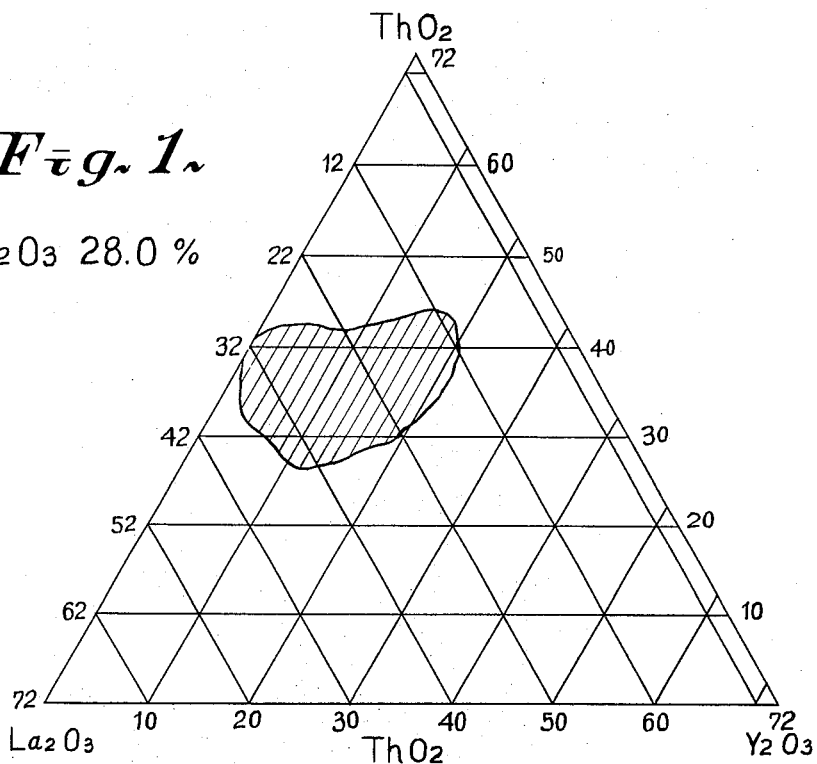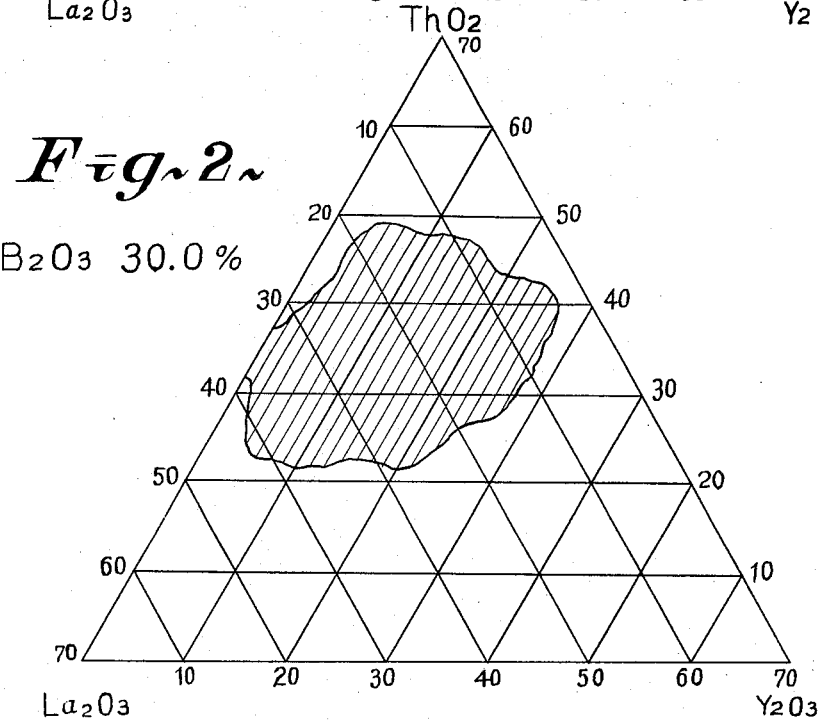

B₂O₃ 38.0 %

$B_2O_3$ 41.0 %

$B_2O_3$ 38.0% $BaO$ 2%

$B_2O_3$ 38.0% BaO 4%

$B_2O_3$ 38.0% BaO 6%

$B_2O_3$ 38.0% $BaO$ 6%

× A glass of the present invention.
● A glass of G.W. Morey's Patent.
◉ A glass of W. Geffcken's Patent.

3,669,696
OPTICAL GLASS

Ichizo Suzuki, Sagamihara-shi, Hideo Yasui, Tokyo, and Kazuhiko Nanba, Sagamihara-shi, Japan, assignors to Kabushiki Kaisha Ohara Kogaku Garasu Seizosho, Sagamihara-shi, Kanagawa-ken, Japan
Filed July 9, 1969, Ser. No. 840,382
Claims priority, application Japan, Sept. 16, 1968, 43/67,808
Int. Cl. C03c 3/00, 3/14, 3/30
U.S. Cl. 106—47 Q
3 Claims

ABSTRACT OF THE DISCLOSURE

This invention relates to the optical glass of high refraction and low dispersion having a basic composition in the range of $B_2O_3$ 28–42%, $Y_2O_3$ 2–25%, $La_2O_3$ 5–55%, $ThO_2$ 2–45% of weight ratio. In the attached drawings, FIGS. 1, 2, 3, 4 and 5 are triangular diagrams showing the stable region of glass formation in the composition $$B_2O_3\text{-}Y_2O_3\text{-}La_2O_3\text{-}ThO_2$$

Figure 8:
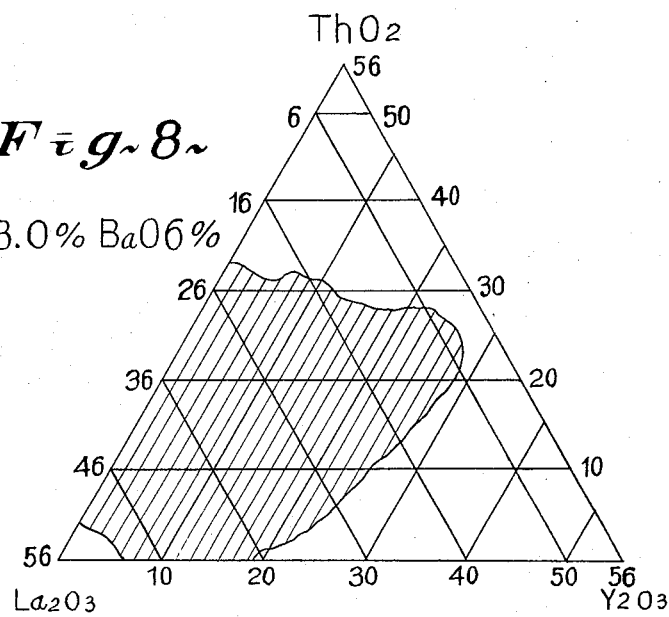
Figure 9:
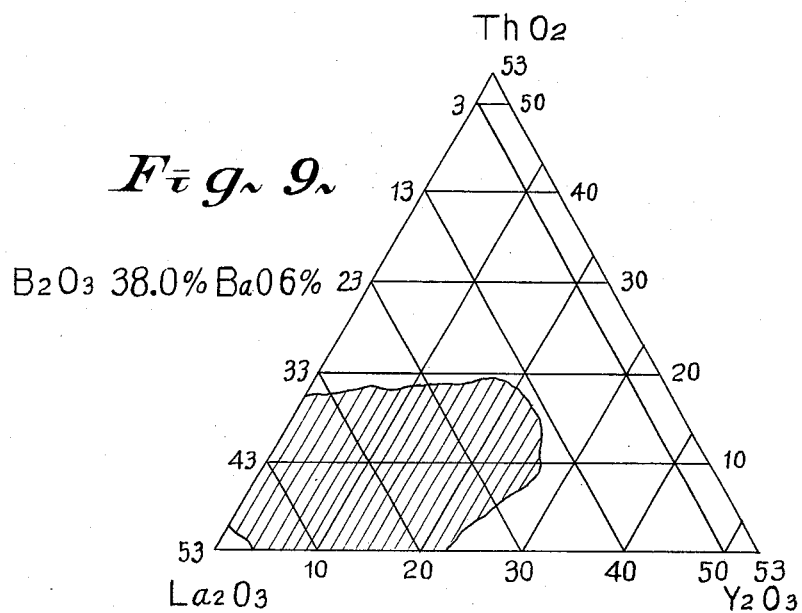
Figure 10:
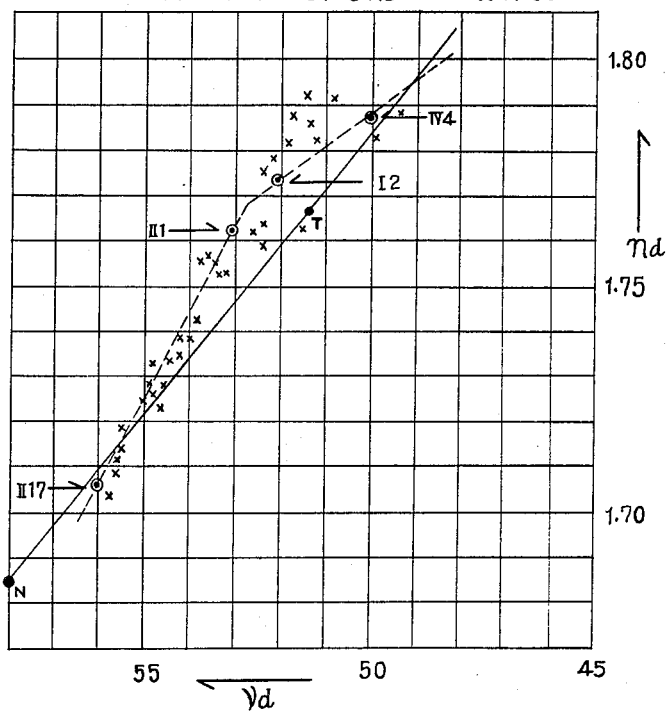

four component series. FIGS. 6, 7, 8 and 9 are triangular diagrams showing the stable region of glass formation in the composition ratios of the $B_2O_3\text{-}Y_2O_3\text{-}La_2O_3\text{-}ThO_2\text{-}BaO$ five component series. FIG. 10 is an $Nd\text{-}vd$ diagram showing the optical value of some examples in the tables.

---

The present invention relates to optical glass having high refraction and low dispersion and particularly to a glass having the four component base, $$B_2O_3\text{-}Y_2O_3\text{-}La_2O_3\text{-}ThO_2.$$

The inventors discovered the glassforming region of $B_2O_3\text{-}Y_2O_3\text{-}La_2O_3\text{-}ThO_2$ four component glass wherein $B_2O_3$ is present in amounts of 28%, 30%, 34%, 38% and 41% in weight respectively (same hereinafter), and have studied the optical property and tendency of devitrification thereof. As the result, it has been found that this four component glass series can produce glass having a very advantageous optical value, i.e. the glass has a low dispersion and resistivity to devitrification which is very great compared with known glass. In the glass series having the four components, $B_2O_3\text{-}Y_2O_3\text{-}La_2O_3\text{-}ThO_2$, the glassformation regions in case of glass containing 28–41% of $B_2O_3$ are shown in FIGS. 1–5; they occupy a fairly large domain, when $B_2O_3$ is present in amounts of 28%, 30% and 34% and it decreases considerably at a $B_2O_3$ content of 38% of $B_2O_3$ and is limited to the side having greater content of $La_2O_3$ at a $B_2O_3$ content of 41% of $B_2O_3$.

Now, there is no distinct scale defining glassformation to determine whether a composition is glassified or not. For example, when a few grams of glass is melted, and cooled rapidly from the molten state and is then in a glassy state, it can be said that it is glassified; hitherto, when a glassforming region is to be determined this is about the scale of melting which has been carried out.

The object of the present invention is to obtain stable glass by manufacturing it on an industrial scale, for this reason the usual scale of melting a few grams is enlarged to 100 grams in the method for determining the glassforming range, and the enlarged batch of glass is melted in a platinum pot at 1300° C.–1400° C., the mixture is taken out of the pot in the molten state and cooled as is. The composition with no appearance of devitrification on the glass surface or in the glass is said to be glassified and the glassforming region has been determined.

The stability of $B_2O_3\text{-}Y_2O_3\text{-}La_2O_3\text{-}ThO_2$ four component glass can be recognized from the extent of the glassforming region in compositions containing 28%, 30% and 34% of $B_2O_3$, but the inventors of this invention have carried out comparative tests in order to certify the fact that the glass of four components of the present invention is more stable as compared with the three components series of $$B_2O_3\text{-}La_2O_3\text{-}ThO_2$$

glass as follows.

Figure 3:
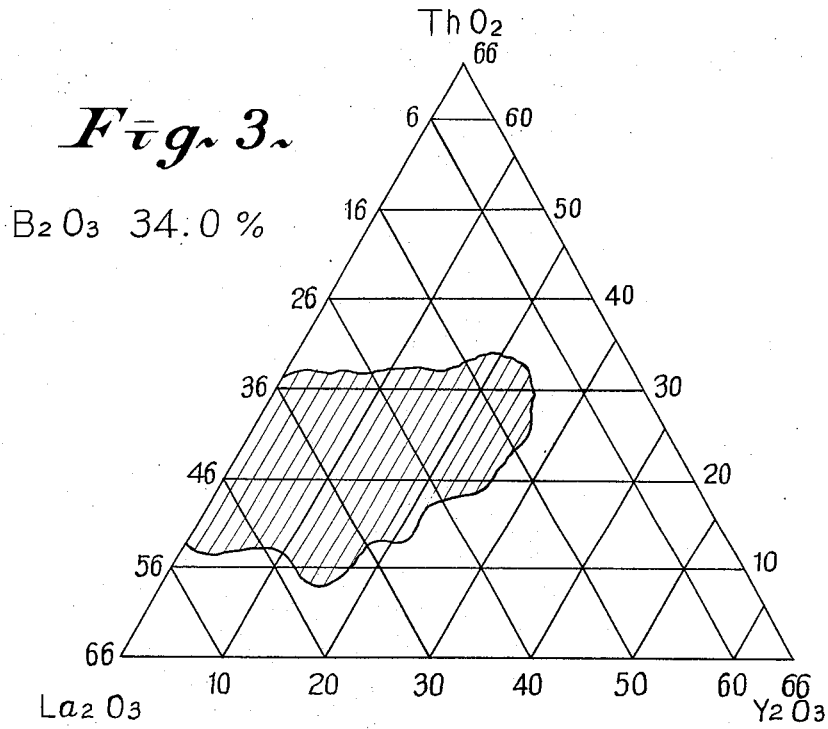
Figure 4:
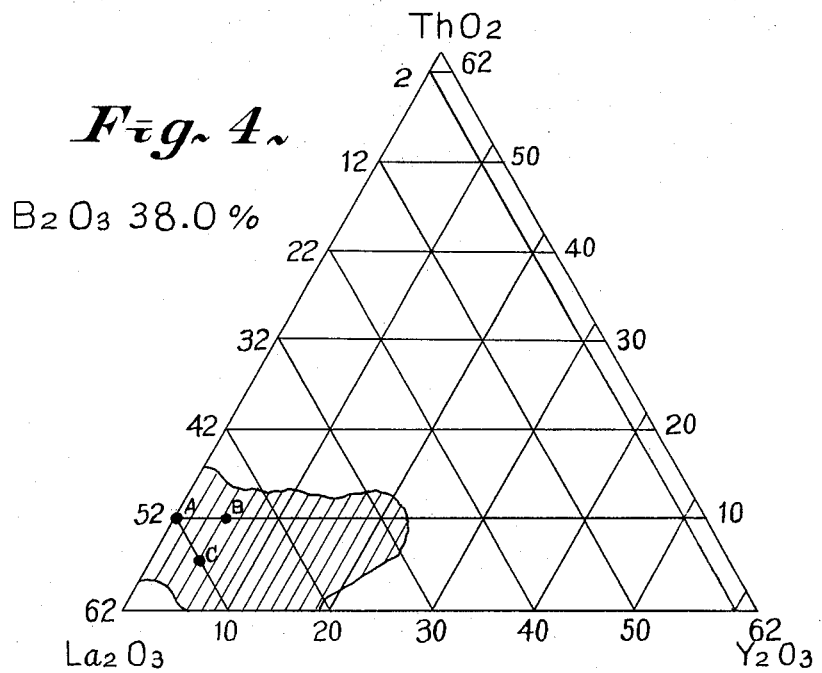

Namely, in the glassforming region at a content of $B_2O_3$ 38% as shown in FIG. 4, three kinds of glass designated A, B and C are tested and compared: glass not containing $Y_2O_3$ having the composition $B_2O_3$ 38%, $La_2O_3$ 52%, $ThO_2$ 10%; as composition A a glass having the composition: $B_2O_3$ 38%, $La_2O_3$ 47%, $ThO_2$ 10%, $Y_2O_3$ 5% as composition B; and a glass having the composition $B_2O_3$ 38%, $La_2O_3$ 52%, $ThO_2$ 5%, $Y_2O_3$ 5% as composition C. To perform a comparison test of devitrification tendency, each composition has been subjected to the steps of lowering the temperature to 1200° C. after melting, then retaining for fifteen minutes at 1200° C., and lowering the temperature at uniform speed for one hour and fifteen minutes, and then was taken out of the furnace and was observed. Glass A not containing $Y_2O_3$ and composed of $B_2O_3$ 38%, $La_2O_3$ 52%, $ThO_2$ 10% crystallized perfectly to the inner part. No crystal appeared either on the surface or inner part of the glass B composed of $B_2O_3$ 38%, $La_2O_3$ 47%, $ThO_2$ 10%, $Y_2O_3$ 5%. In glass C composed of $B_2O_3$ 38%, $La_2O_3$ 52%, $ThO_2$ 5%, $Y_2O_3$ 5%, only its surface layer was crystallized but the results thereof were good compared with the glass A not containing $Y_2O_3$.

As the examples of the four component series, glass, the glass composition in weight percentage and the optical constant $Nd$, $vd$ are shown in the Table 1 as follows:

TABLE 1

| Sample No. | $B_2O_3$ | $La_2O_3$ | $ThO_2$ | $Y_2O_3$ | $Nd$ | $v_\mu d$ |
|---|---|---|---|---|---|---|
| 1 | 28 | 17 | 40 | 15 | 1.7882 | 51.8 |
| 2 | 28 | 32 | 30 | 10 | 1.7916 | 51.5 |
| 3 | 28 | 22 | 30 | 20 | 1.7881 | 51.8 |
| 4 | 30 | 20 | 45 | 5 | 1.7750 | 52.3 |
| 5 | 30 | 5 | 40 | 25 | 1.7712 | 52.4 |
| 6 | 30 | 30 | 25 | 15 | 1.7786 | 52.1 |
| 7 | 30 | 15 | 30 | 25 | 1.7751 | 52.4 |
| 8 | 30 | 40 | 25 | 5 | 1.7815 | 51.9 |
| 9 | 34 | 31 | 30 | 5 | 1.7564 | 53.6 |
| 10 | 34 | 16 | 25 | 25 | 1.7500 | 53.4 |
| 11 | 34 | 1 | 20 | 15 | 1.7560 | 53.3 |
| 12 | 34 | 46 | 15 | 5 | 1.7612 | 53.0 |
| 13 | 34 | 41 | 10 | 15 | 1.7601 | 53.1 |
| 14 | 38 | 47 | 10 | 5 | 1.7394 | 54.0 |
| 15 | 38 | 32 | 10 | 20 | 1.7349 | 54.2 |
| 16 | 38 | 52 | 5 | 5 | 1.7423 | 53.9 |
| 17 | 38 | 37 | 5 | 20 | 1.7387 | 54.2 |

In this optical field, there are widely known glasses as disclosed, for example, in U.S. Pat. No. Re. 21,175 by G. W. Morey and German Pat. No. 1,054,209 (U.S. Pat. No. 3,082,101, Japanese pat. publication No. 11,761/1968) by W. Geffcken et al. In FIG. 10 glass N, T having an extremely low dispersion, disclosed by Morey is shown by a full line and the glass II 17, II 1, IV 4 having an extremely low dispersion, disclosed by Geffcken et al. is shown by a broken line. Some examples of the glass according to the present invention in the table are shown by the marks x.

Referring to the optical values of glass composed of 30% and 28% $B_2O_3$, clearly it has a lower dispersion as compared with said former two patents above $Nd$ 1.77, and shows that it is a glass in a new field. Referring to the glass composed of more than 34% of $B_2O_3$, in optical value, it has nearly the same advantage as compared with glass of the $B_2O_3\text{-}La_2O_3\text{-}ThO_2$ series disclosed by Geffcken et al.

Also, there is a U.S. Pat. No. 3,193,400 (Japanese Pat. No. 418,705) of Geffcken disclosing a glass containing $Y_2O_3$, and which shows the glassforming region of the three components series of $B_2O_3$-$La_2O_3$-$Y_2O_3$ a glass having the optical constant of $Nd=1.72–1.76$ $vd=53–55$. But the glassforming region of this series is limited to the narrow extent of $B_2O_3$ being in range of 34–43%. Contrary to the three component glass containing $Y_2O_3$ when the content of $B_2O_3$ is less, i.e. a $B_2O_3$ content of 34–28%, glass having a rather wide stable region can be obtained. In optical properties too, further high refraction and low dispersion are obtainable in the four component glass of the present invention containing 28.32% of $B_2O_3$ and these facts are clearly shown by the Table I and FIG. 10.

Referring to the $B_2O_3$-$Y_2O_3$-$La_2O_3$-$ThO_2$ four component series of this invention, compositions containing $B_2O_3$ 28%, are glassified when $ThO_2$ is present in an amount of 27–45%, but, in the region wherein $ThO_2$ is present in an amount less than this, crystallization is promoted, and in the region wherein $ThO_2$ is present in much greater amount the tendency of phase separation becomes worse and the compositions are not glassified. In compositions containing $B_2O_3$ in an amount of 30%, are glassified when $ThO_2$ is present in an amount of 22–48%, and become stable glass when they contain 28% of $Y_2O_3$. In compositions containing less $ThO_2$ than this, crystallization is promoted and clear glass can not be obtained. In compositions having a much higher $ThO_2$ content than this, the phenomenon of phase separation becomes violent and homogeneous glass can not be obtained. When the $B_2O_3$ content is 34%, the $ThO_2$ content of the stable glass region is decreased to 8–34%, thereby glass cannot be obtained when the $ThO_2$ content is greater than this. When the content of $B_2O_3$ is 38%, this tendency becomes remarkable, the amount of $ThO_2$ in the stable region becomes 0–15%. But in any case, the maximum $Y_2O_3$ content of the stable region reaches to 23–28%.

Figure 6:
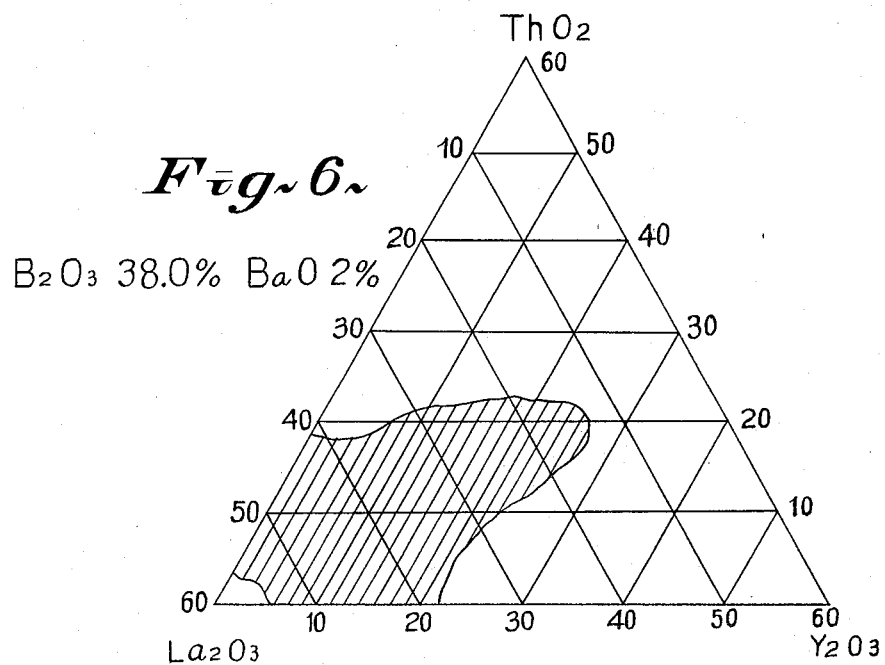
Figure 7:
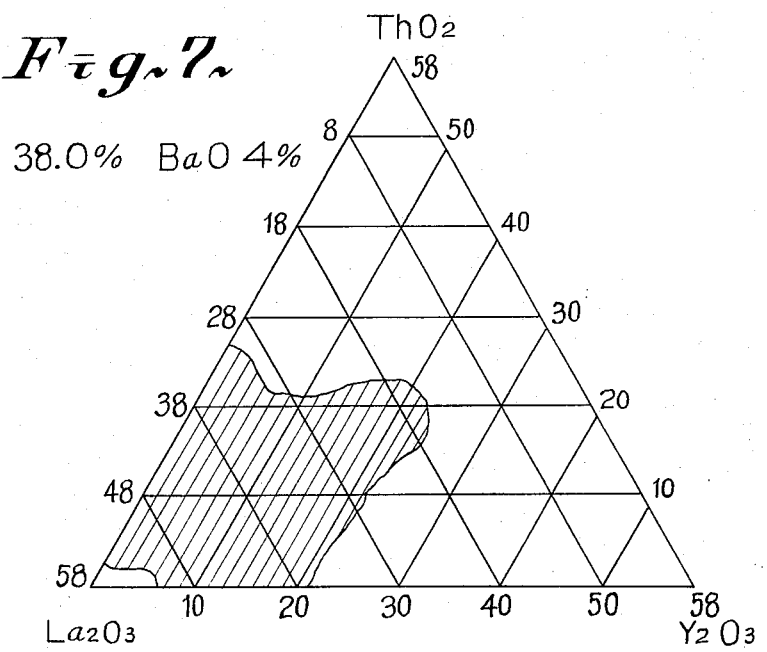

In order to stabilize the glass of the four component series, $B_2O_3$-$Y_2O_3$-$La_2O_3$-$ThO_2$, bivalent metal oxide can be added. Adopting BaO as the most suitable component for extending the glassforming region, without lowering the optical value much, and the glassforming region referred to, the additions of 2%, 4% and 6% of BaO compositions containing $B_2O_3$ in an amount of 38% are shown in FIGS. 6, 7 and 8 and the weight percent of the compositions of the embodied glass and the optical constant $Nd$, $vd$ are shown in Table 2.

It is recognized that when the amount of BaO added is increased, the glassforming region is enlarged very much. But with an increase of the amount of BaO added, Abbe's number $v$ value increases and the lowering of the refractive index is increased so that addition of BaO over 10% is not desirable and it is preferred to add up to 8% by weight. Referring to the other bivalent metal oxides too, over 10% is not desirable considering the optical properties and it is preferred to include the bivalent metal oxides in the present compositions in a total amount not exceeding 8% by weight.

TABLE 2

| Sample No. | $B_2O_3$ | $La_2O_3$ | $ThO_2$ | $Y_2O_3$ | BaO | $Nd$ | $\mu d$ |
|---|---|---|---|---|---|---|---|
| 18 | 38 | 15 | 20 | 25 | 2 | 1.7283 | 54.6 |
| 19 | 38 | 40 | 15 | 5 | 2 | 1.7337 | 54.4 |
| 20 | 38 | 35 | 10 | 15 | 2 | 1.7331 | 54.3 |
| 21 | 38 | 40 | 0 | 20 | 2 | 1.7360 | 54.3 |
| 22 | 38 | 33 | 20 | 5 | 4 | 1.7261 | 54.8 |
| 23 | 38 | 18 | 20 | 20 | 4 | 1.7233 | 54.7 |
| 24 | 38 | 38 | 10 | 10 | 4 | 1.7283 | 54.6 |
| 25 | 38 | 48 | 5 | 5 | 4 | 1.7341 | 54.5 |
| 26 | 38 | 43 | 0 | 15 | 4 | 1.7344 | 54.5 |
| 27 | 38 | 36 | 15 | 5 | 6 | 1.7283 | 54.9 |
| 28 | 38 | 26 | 15 | 15 | 6 | 1.7243 | 55.0 |
| 29 | 38 | 11 | 25 | 20 | 6 | 1.1753 | 55.0 |
| 30 | 38 | 6 | 25 | 25 | 6 | 1.7151 | 55.0 |

Table 3 shows examples embodying glass containing MgO, CaO, SrO, BaO, CdO, ZnO, $Al_2O_3$, $GeO_2$, $ZrO_2$, $Nb_2O_5$, or $Ta_2O_5$ in addition to the four components $B_2O_3$-$Y_2O_3$-$La_2O_3$-$ThO_2$.

The addition of $Ta_2O_5$, $ZrO_2$, $Nb_2O_5$ is very effective for preventing the tendency toward devitrification even though it has the defect of increasing the dispersion but especially referring to glass having a $Nd$ above 1.75, such an addition is very desirable. But when the content of $Ta_2O_5$, $ZrO_2$, $Nb_2O_5$ is over 10% individually, or when the sum of two or three components exceeds 15%, we cannot obtain glass having a low dispersion which is the object of this invention.

TABLE 3

| Sample No. | $B_2O_3$ | $La_2O_3$ | $ThO_2$ | $Y_2O_3$ | Additional component | | $Nd$ | $vd$ |
|---|---|---|---|---|---|---|---|---|
| 31 | 38 | 38 | 10 | 10 | MgO | 4 | 1.7267 | 54.5 |
| 32 | 38 | 38 | 10 | 10 | CaO | 4 | 1.7325 | 54.7 |
| 33 | 38 | 38 | 10 | 10 | SrO | 4 | 1.7321 | 54.8 |
| 34 | 38 | 38 | 10 | 10 | CdO | 4 | 1.7357 | 54.3 |
| 35 | 38 | 38 | 10 | 10 | ZnO | 4 | 1.7346 | 53.7 |
| 36 | 38 | 40 | 10 | 10 | $Al_2O_3$ | 2 | 1.7304 | 54.5 |
| 37 | 38 | 38 | 10 | 10 | $Al_2O_3$ | 4 | 1.7212 | 54.5 |
| 38 | 34 | 34 | 20 | 10 | MgO | 2 | 1.7534 | 53.3 |
| 39 | 34 | 34 | 20 | 10 | CaO | 2 | 1.7573 | 53.8 |
| 40 | 34 | 34 | 20 | 10 | CdO | 2 | 1.7630 | 52.4 |
| 41 | 34 | 34 | 20 | 10 | ZnO | 2 | 1.7572 | 53.1 |
| 42 | 34 | 34 | 20 | 10 | BaO | 2 | 1.7560 | 53.5 |
| 43 | 34 | 34 | 20 | 10 | SrO | 2 | 1.7560 | 53.4 |
| 44 | 34 | 34 | 20 | 10 | $Ta_2O_5$ | 2 | 1.7595 | 52.4 |
| 45 | 34 | 34 | 20 | 10 | $Nb_2O_5$ | 2 | 1.7628 | 51.6 |
| 46 | 34 | 34 | 20 | 10 | $ZrO_2$ | 2 | 1.7616 | 52.6 |
| 47 | 34 | 34 | 20 | 10 | $GeO_2$ | 2 | 1.7534 | 53.2 |
| 48 | 30 | 30 | 27 | 10 | $Ta_2O_5$ | 3 | 1.7819 | 51.1 |
| 49 | 30 | 30 | 27 | 10 | $Nb_2O_5$ | 3 | 1.7880 | 49.4 |
| 50 | 30 | 30 | 27 | 10 | $ZrO_2$ | 3 | 1.7858 | 51.3 |
| 51 | 30 | 30 | 27 | 10 | $GeO_2$ | 3 | 1.7727 | 52.0 |
| 52 | 30 | 30 | 24 | 10 | $Ta_2O_5$ | 6 | 1.7832 | 50.0 |
| 53 | 30 | 30 | 24 | 10 | $Nb_2O_5$ | 6 | 1.7963 | 47.0 |
| 54 | 30 | 30 | 24 | 10 | $ZrO_2$ | 6 | 1.7910 | 50.9 |
| 55 | 30 | 30 | 24 | 10 | $GeO_2$ | 6 | 1.7663 | 52.0 |
| 56 | 30 | 30 | 28 | 10 | BaO | 2 | 1.7764 | 52.3 |
| 57 | 30 | 30 | 28 | 10 | CdO | 2 | 1.7803 | 52.0 |
| 58 | 30 | 30 | 26 | 10 | CdO | 4 | 1.7804 | 52.0 |
| 59 | 30 | 30 | 24 | 10 | CdO | 6 | 1.7801 | 51.8 |
| 60 | 30 | 30 | 26 | 10 | ZnO | 4 | 1.7775 | 51.9 |

The addition of $GeO_2$ is also effective for preventing the tendency toward devitrification tendency, but using over 10% is not desirable, because the refractive index is lowered without changing the $v$ value.

$WO_3$ and $TiO_2$ elevate the refractive index, and are effective for preventing devitrification but they increase dispersion, so that their contents must be restricted to a small amount.

$SiO_2$ and $Al_2O_3$ serve to prevent devitrification for most of these kinds of glass, even by the addition of a small amount. But when over 5% is added, the optical property is deteriorated and at the same time melting of the raw material becomes difficult, so that it is not desired.

According to one embodiment of the optical glass of the invention containing the four basic constituents, $B_2O_3$-$Y_2O_3$-$La_2O_3$ and $ThO_2$ in the amounts previously indicated, except that $B_2O_3$ is present in an amount of 28–40% by weight the glass also contains one or more component selected from

|  | Percent by wt. |
|---|---|
| $Ta_2O_5$ | 0–10 |
| $ZrO_2$ | 0–10 |
| $Nb_2O_5$ | 0–10 |
| $GeO_2$ | 0–10 |
| $Al_2O_3$ | 0–5 | and one or more components in a total amount of up to 8% by weight selected from MgO, CaO, BaO, SrO, ZnO and CdO, as pointed out above. The total amount of the combination of two or more of the components $Ta_2O_5$, $ZrO_2$ and $Nb_2O_5$ should not exceed 15% by weight.

Alkali metal oxides can be added to the above-described composition containing 28–40% $B_2O_3$ with a resultant improvement in the stability of the glass.

Figure 5:
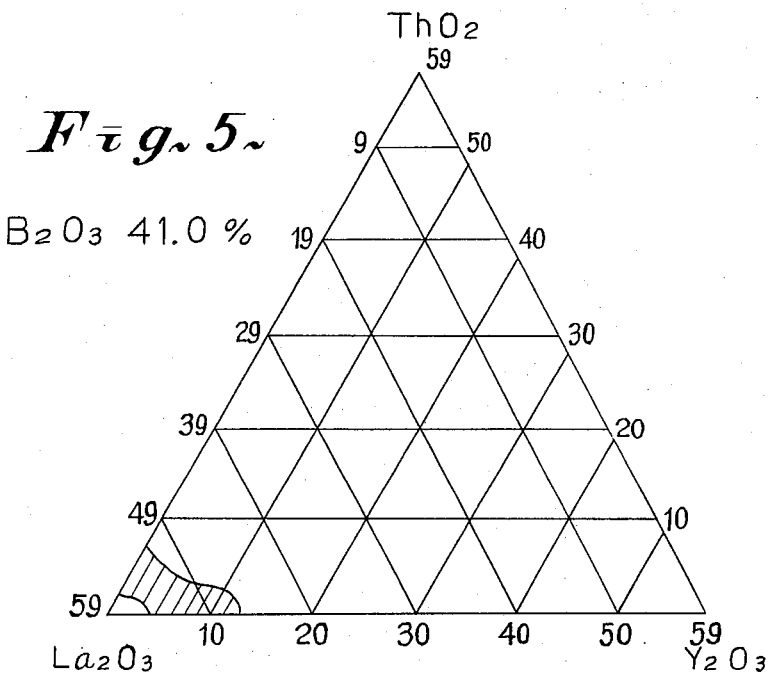

Next, in composition containing $B_2O_3$ in an amount of 40–42%, as clearly seen from FIG. 5, the glassforming region of the $B_2O_3$-$Y_2O_3$-$La_2O_3$-$ThO_2$ four component series is very narrow. For this series having a reasonable content of $B_2O_3$, to increase the stability, it is desirable to add 3–10% of a bivalent metal oxide. FIG. 9 shows the glassforming range of compositions containing $B_2O_3$ in an amount of 41% and also containing 6% of BaO, but it extends extensively towards the side having a high content of $ThO_2$ and $Y_2O_3$ as compared with the series without BaO. Table 4 shows examples embodying the glass containing BaO, CaO, MgO, SrO, BeO, $Al_2O_3$ and $SiO_2$ in addition to $B_2O_3$ in an amount of 41%, $Y_2O_3$, $La_2O_3$, $ThO_2$ glass.

TABLE 4

| Sample No. | $B_2O_3$ | $La_2O_3$ | $ThO_2$ | $Y_2O_3$ | Additional component | | $N_d$ | $\nu_d$ |
|---|---|---|---|---|---|---|---|---|
| 61 | 41 | 23 | 10 | 20 | BaO | 6 | 1.7094 | 55.6 |
| 62 | 41 | 38 | 10 | 5 | BaO | 6 | 1.7122 | 55.5 |
| 63 | 41 | 43 | 5 | 5 | BaO | 6 | 1.7141 | 55.5 |
| 64 | 41 | 33 | 5 | 15 | BaO | 6 | 1.7133 | 55.6 |
| 65 | 41 | 28 | 10 | 15 | SrO | 6 | 1.7121 | 55.6 |
| 66 | 41 | 43 | 5 | 5 | CaO | 6 | 1.7177 | 55.4 |
| 67 | 41 | 43 | 5 | 5 | MgO | 6 | 1.7082 | 55.5 |
| 68 | 41 | 28 | 10 | 15 | CaO | 6 | 1.7139 | 55.5 |
| 69 | 41 | 28 | 10 | 15 | MgO | 6 | 1.7041 | 55.7 |
| 70 | 41 | 38 | 5 | 10 | BaO, BeO | 4, 2 | 1.7072 | 55.2 |
| 71 | 41 | 41 | 5 | 5 | CaO, $Al_2O_3$ | 6, 2 | 1.7094 | 55.2 |
| 72 | 41 | 40 | 4 | 5 | CaO, $SiO_2$, BeO | 6, 3, 1 | 1.6993 | 56.0 |

Concerning $Ta_2O_5$, $ZrO_2$, $Nb_2O_5$, $GeO_2$, $WO_3$, $TiO_2$, only a small amount of these components may be added to this series having a reasonable amount of $B_2O_3$, because these oxides have a strong tendency to increase dispersion. $Al_2O_3$, $SiO_2$ and BeO have the effect of preventing devitrification for compositions having a low content of $ThO_2$, but when their contents are over 5%, optical properties are deteriorated and melting of the raw material becomes difficult so that it is not desirable.

Alkali metal oxides can be added also to the composition including 40-42% $B_2O_3$ for improving the stability of the glass.

Glass having high refraction and low dispersion which is composed of the basic glass, $B_2O_3$-$Y_2O_3$-$La_2O_3$-$ThO_2$ four component series of this invention is almost colorless or presents only a faint yellow green color and is superior too in chemical stability, acid resistance and weathering resistance.

As raw materials, $B_2O_3$ may be obtained from $H_3BO_3$; BaO and SrO may be obtained from their nitrates, for MgO, CaO, and CdO the carbonate is used; and to obtain the other components, the oxides may be used as the glass raw material for preparation and can be produced by using a platinum pot according to the usual manufacturing process.

Despite the use of some illustrative examples of embodiments of the invention as described above, it is clear that the present invention is not to be limited to those examples of application, but can be variously modified within the scope of the spirit of invention indicated in the patent claims.

We claim:

1. An optical glass composition consisting essentially of the components $B_2O_3$, $Y_2O_3$, $La_2O_3$ and $ThO_2$ in a mixture ratio in the range:

| | Percent by wt. |
|---|---|
| $B_2O_3$ | 28–42 |
| $Y_2O_3$ | 2–24 |
| $La_2O_3$ | 5–55 |
| and $ThO_2$ | 2–45 | the amount of $Y_2O_3$ being sufficient to render glass more stable against crystallization than the corresponding glass not containing $Y_2O_3$.

2. An optical glass composition as set forth in claim 1, in which the component $B_2O_3$ is in the range 28–40% by weight; and further containing at least one component selected from the group consisting of $Ta_2O_5$, $ZrO_2$, $Nb_2O_5$, and $GeO_2$, each in an amount of up to 10% by weight, and $Al_2O_3$ in an amount up to 5% by weight, with the proviso that the total amount of $Ta_2O_5$, $ZrO_2$ and $Nb_2O_5$ does not exceed 15% by weight; and one component in a total amount of up to 8% by weight selected from the groups consisting of MgO, CaO, BaO, SrO, ZnO, CdO, and mixtures thereof.

3. An optical glass composition as set forth in claim 1, in which the component $B_2O_3$ is included in an amount of 40–42% by weight; and further containing one component in a total amount of 3–10% by weight selected from the group consisting of MgO, CaO, BaO, SrO, and mixtures thereof; and one component in a total amount of less than 5% by weight selected from the group consisting of BeO, $SiO_2$, $Al_2O_3$, and mixtures thereof.

References Cited

UNITED STATES PATENTS

| Re. 21,175 | 8/1939 | Morey | 106—47 Q |
| 3,082,101 | 3/1963 | Geffcken et al. | 106—47 Q |

FOREIGN PATENTS

| 1,109,698 | 4/1968 | Great Britain | 106—47 Q |

TOBIAS E. LEVOW, Primary Examiner

M. L. BELL, Assistant Examiner

U.S. Cl. X.R.

106—47 R